Oct. 25, 1955                    K. H. WILSON                       2,721,778
              TABLE AND MEANS FOR CONTROLLING AND GUIDING
              THE FOLDING THEREOF INTO FOLDED POSITION
Filed Feb. 12, 1953                                        9 Sheets-Sheet 1
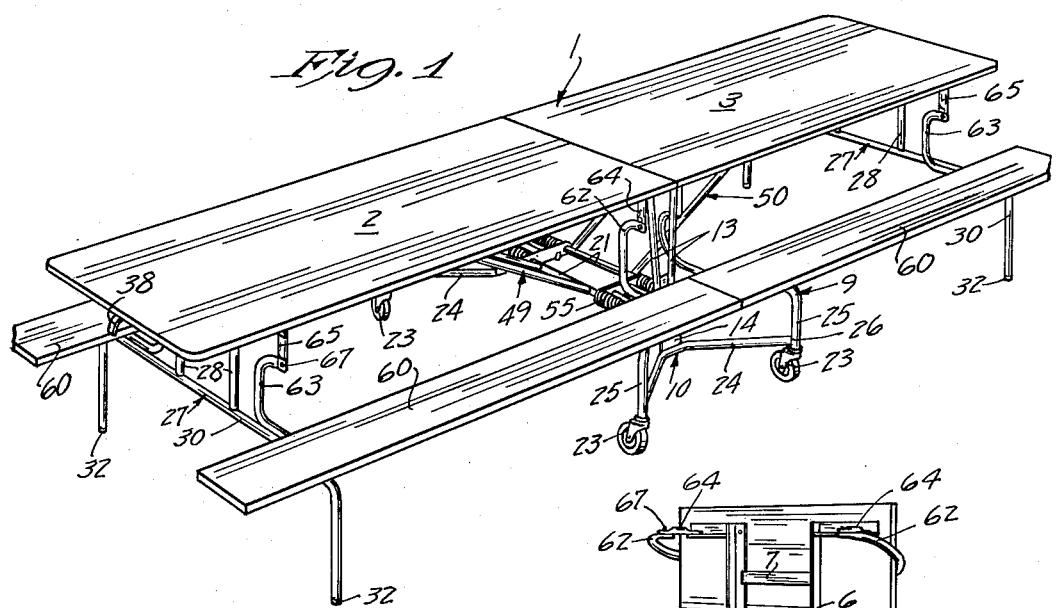
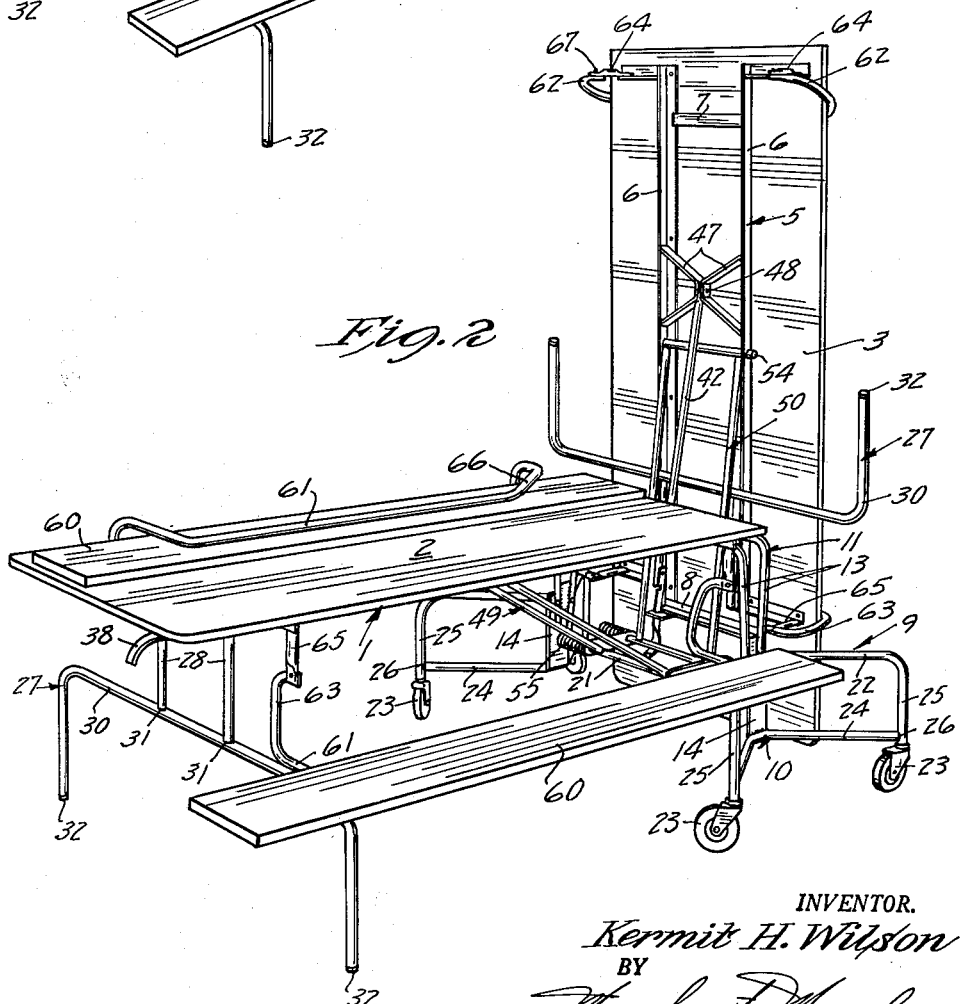
INVENTOR.
Kermit H. Wilson
BY
Merchant & Merchant
ATTORNEYS

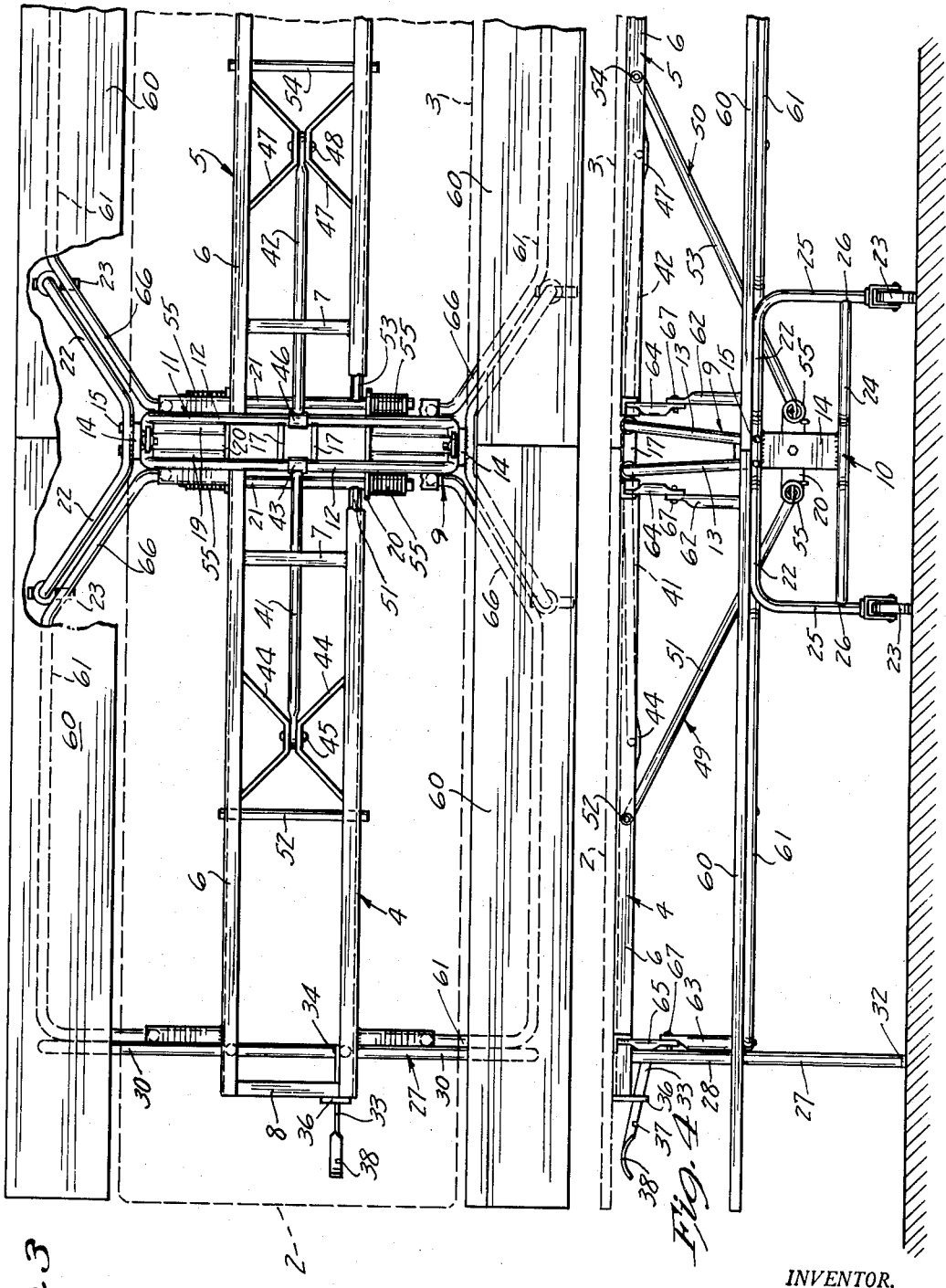

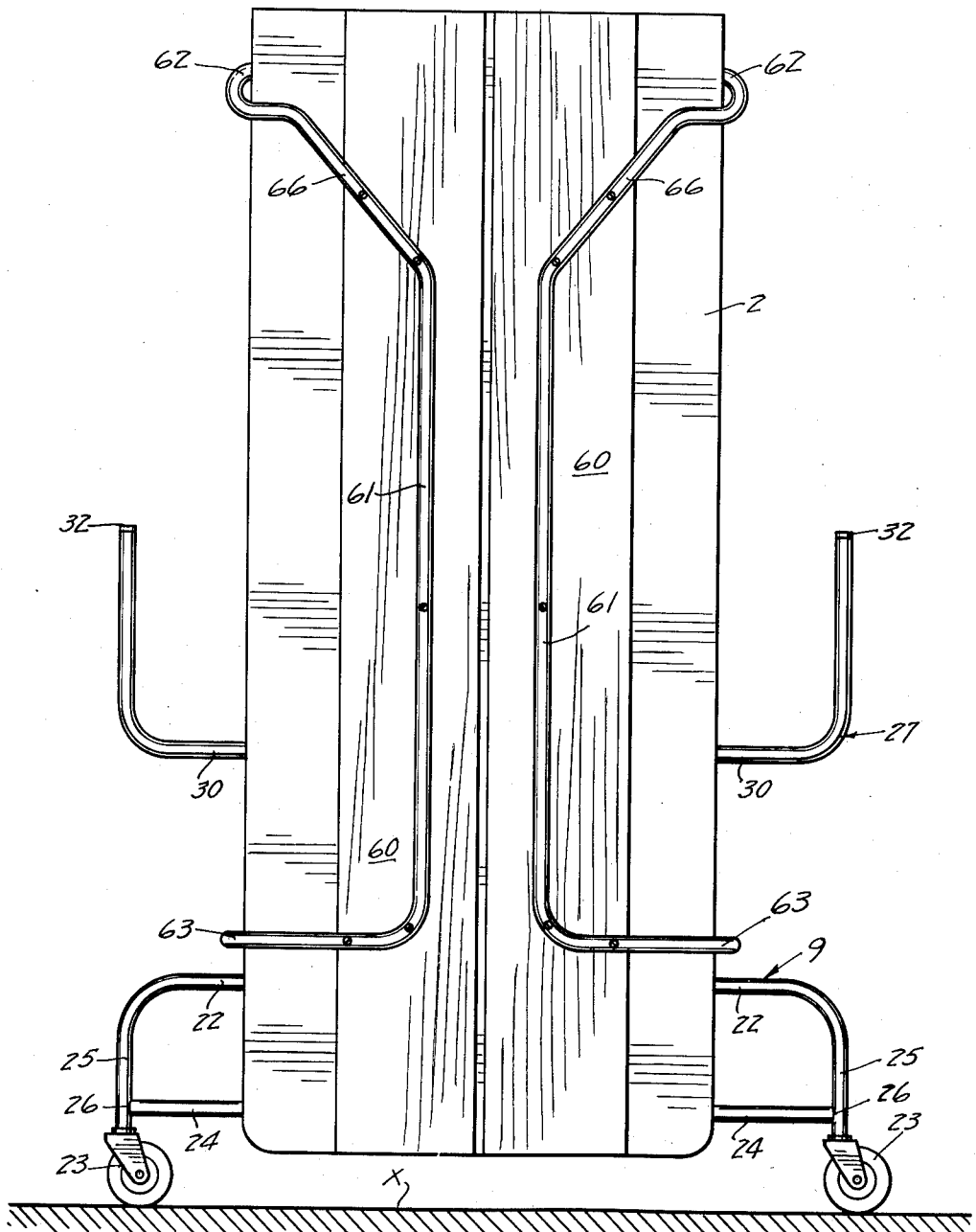

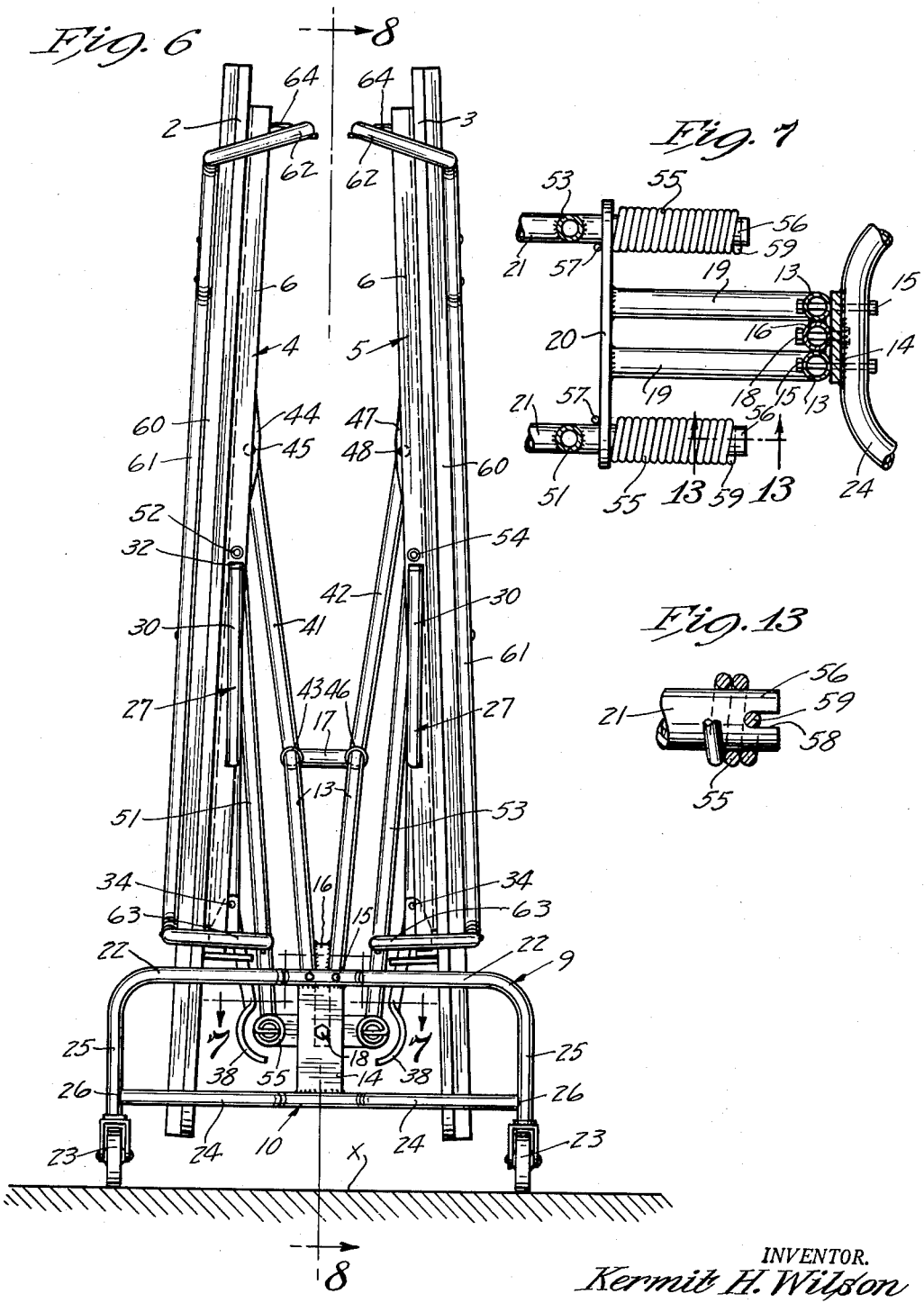

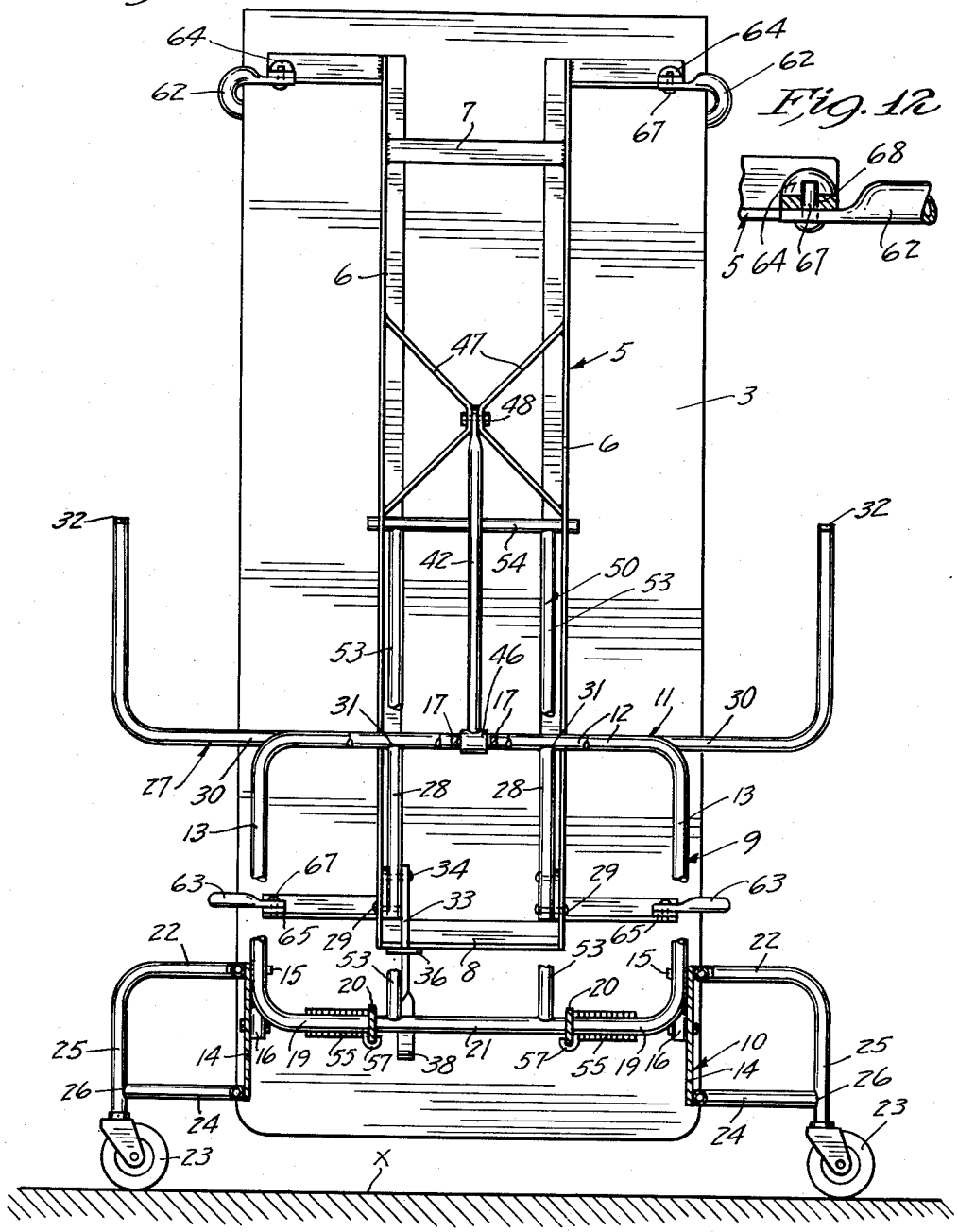

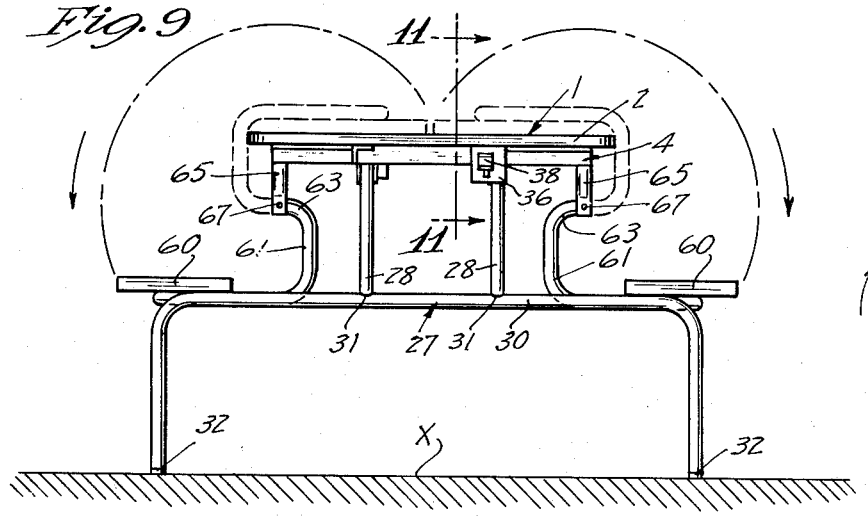
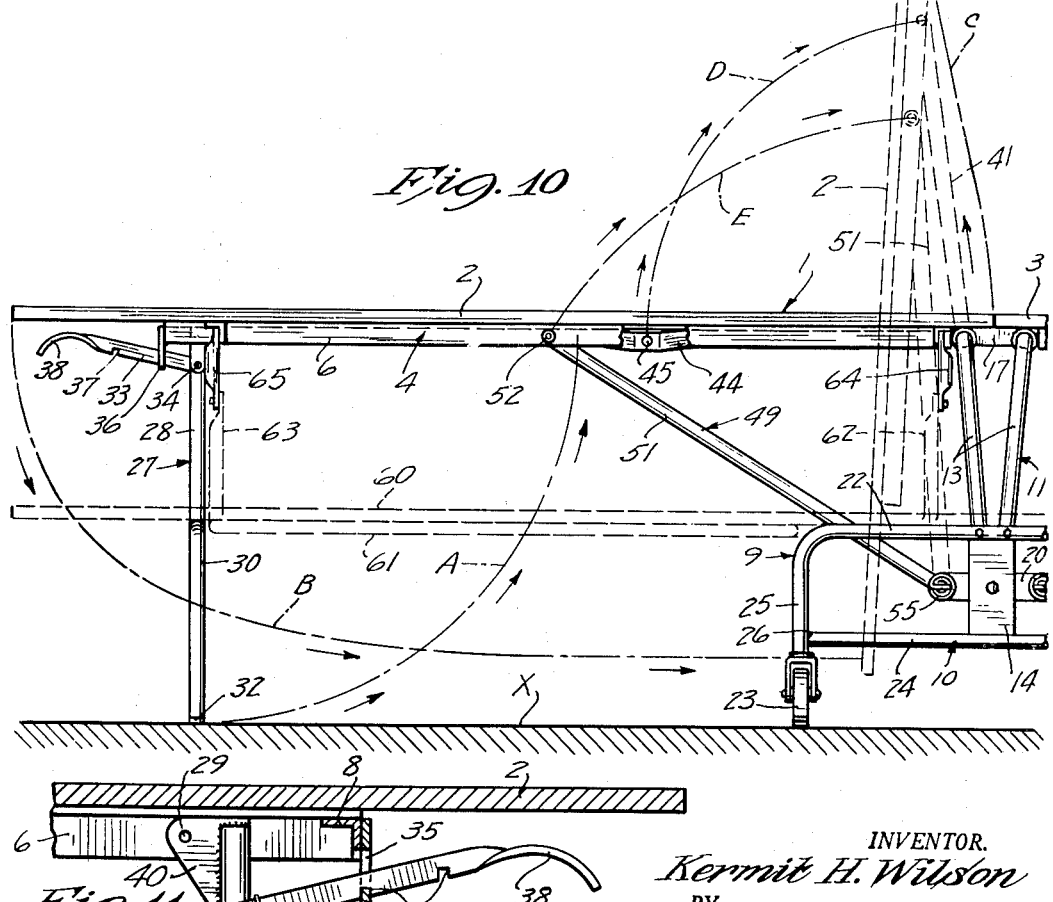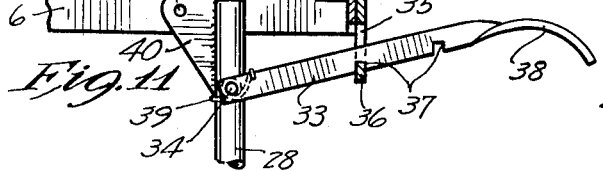

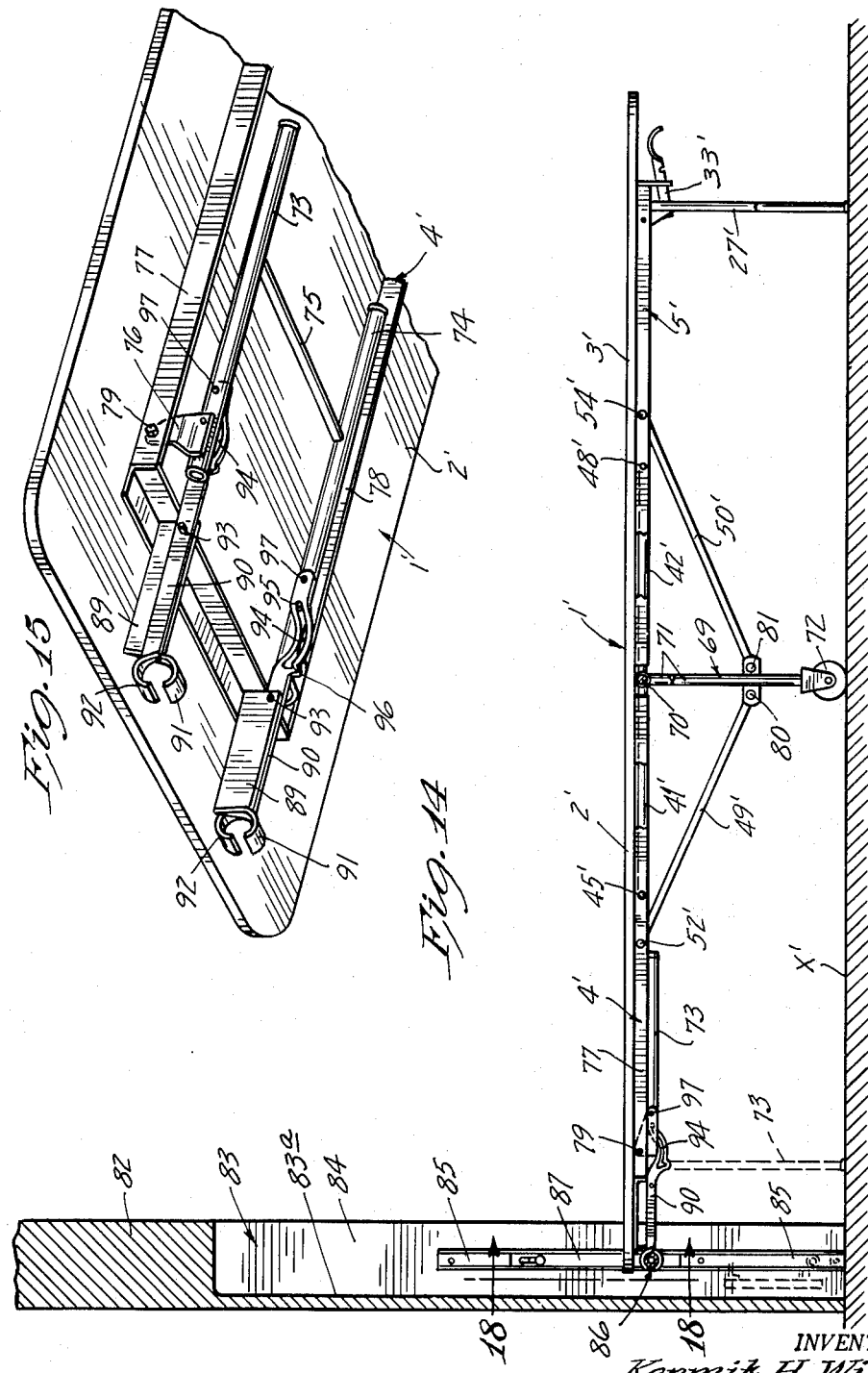

Oct. 25, 1955        K. H. WILSON        2,721,778
TABLE AND MEANS FOR CONTROLLING AND GUIDING
THE FOLDING THEREOF INTO FOLDED POSITION
Filed Feb. 12, 1953        9 Sheets-Sheet 8
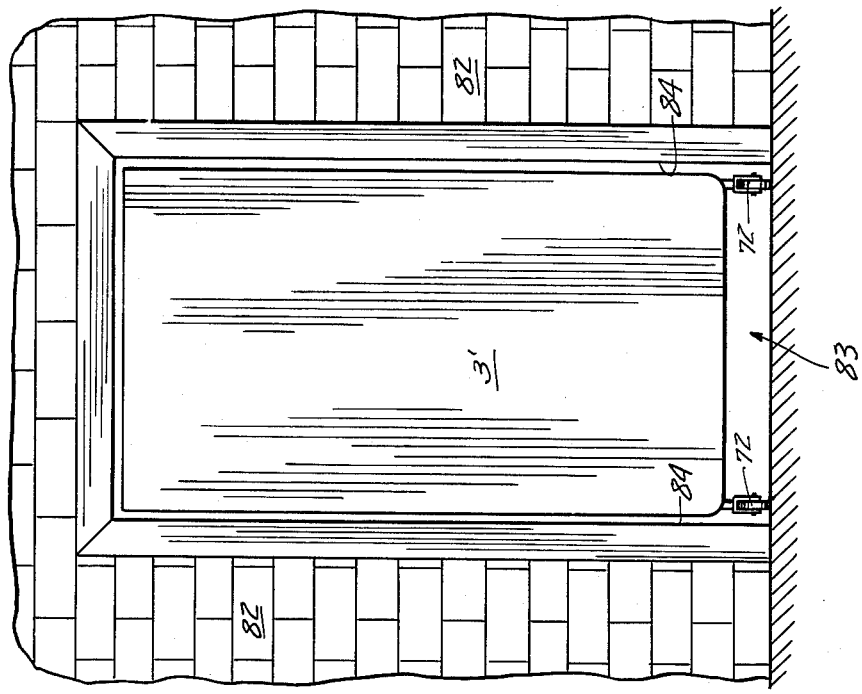
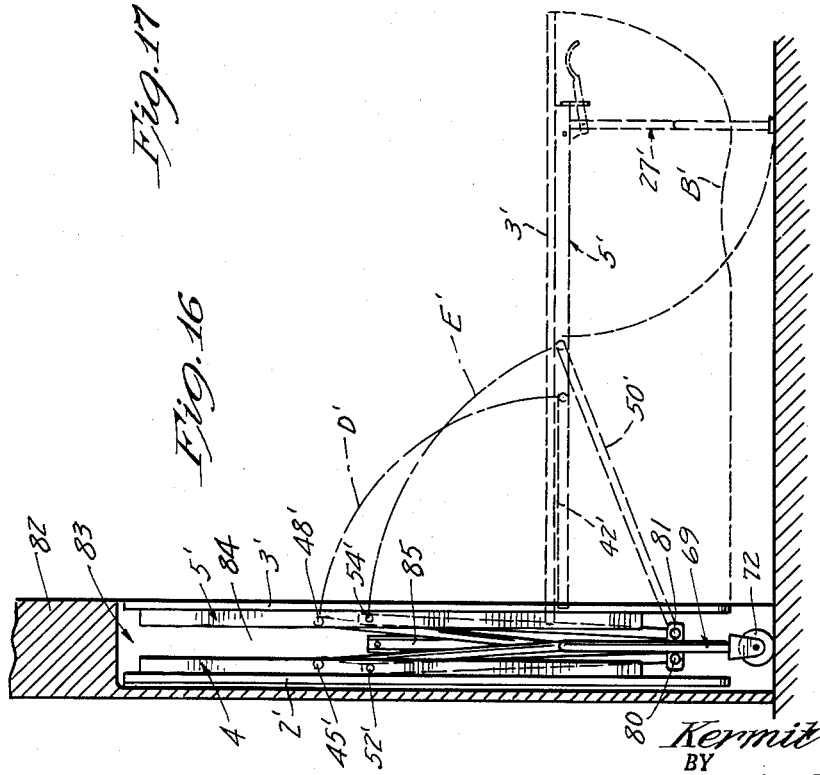
INVENTOR.
*Kermit H. Wilson*
BY
*Merchant & Merchant*
ATTORNEYS

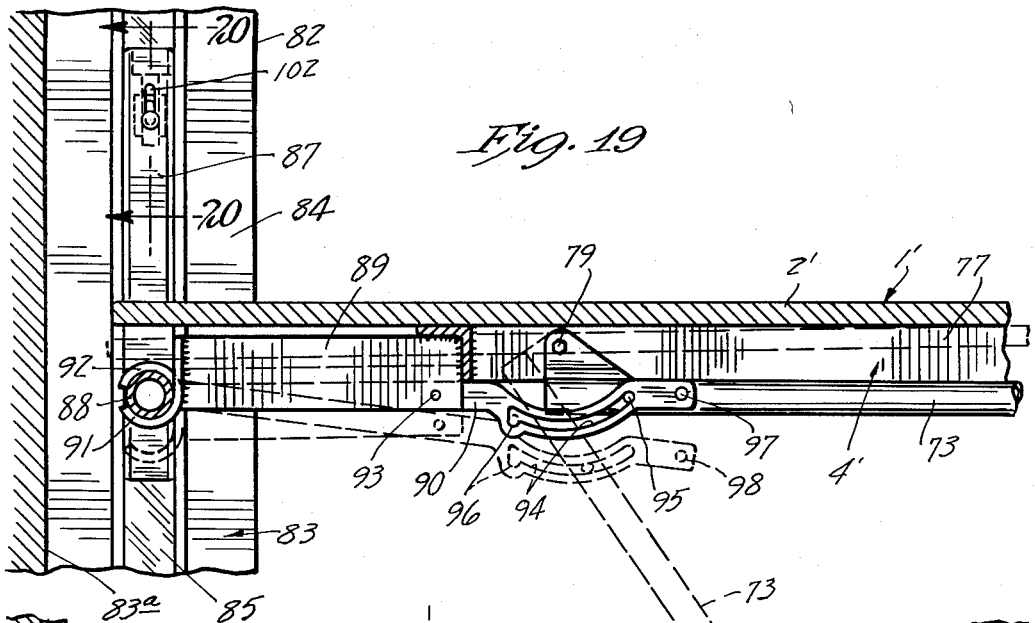
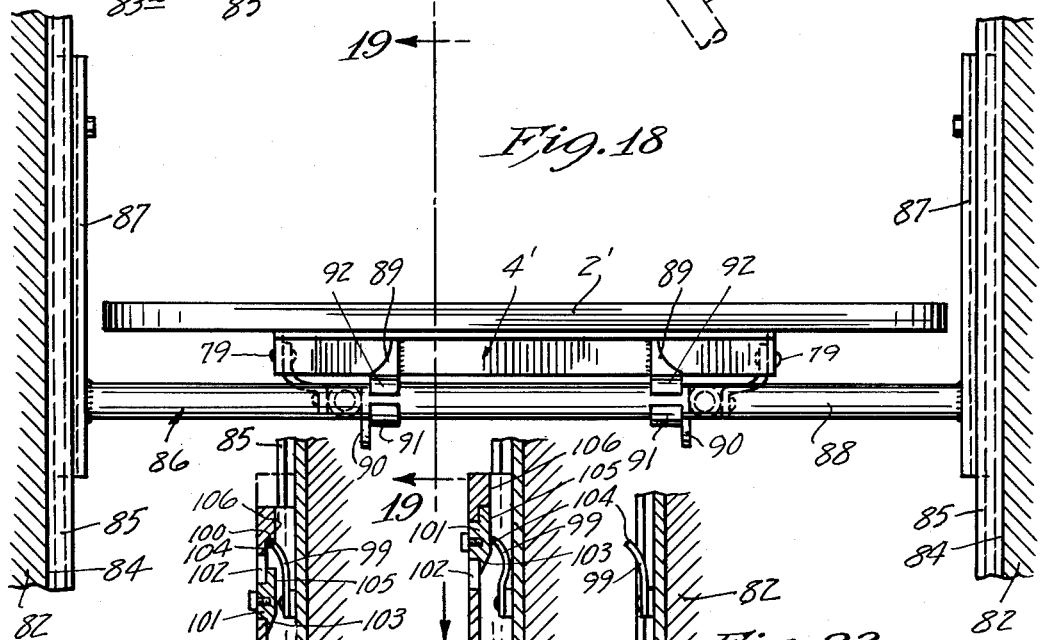
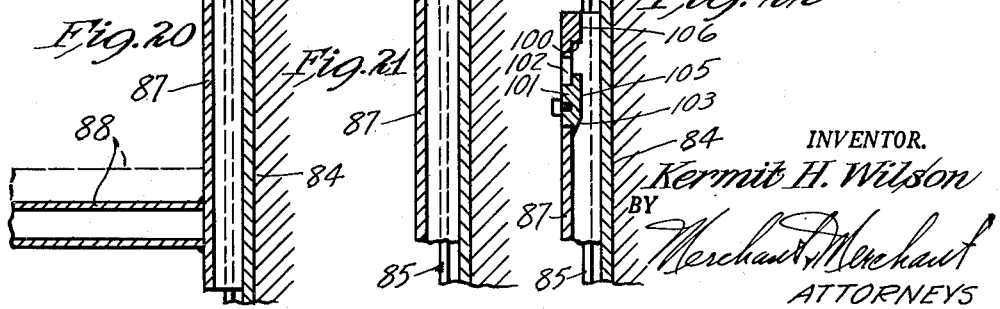

United States Patent Office 2,721,778
Patented Oct. 25, 1955

2,721,778

TABLE AND MEANS FOR CONTROLLING AND GUIDING THE FOLDING THEREOF INTO FOLDED POSITION

Kermit H. Wilson, Minneapolis, Minn.

Application February 12, 1953, Serial No. 336,491

7 Claims. (Cl. 311—89)

My invention relates generally to table structures and more particularly to tables which may be folded for storage and the like.

Tables of this type are generally adapted to be set up in banquet halls, ballrooms and the like, and are designed to accommodate fairly large numbers of people seated thereabout. Where space is at a premium, and it is desired that a single room be utilized for eating purposes, after which it is desired that the room be cleared for dancing or other purposes, it is important that the tables be removed from the room with a maximum of speed and a minimum of effort and disturbance. An important object of my invention is, therefore, the provision of a table which may be quickly and easily set up for use, and which may as readily be folded to an inoperative storage position and moved to an out-of-the-way location with a minimum of time and effort involved.

Still another object of my invention is the provision of novel linkage and counterbalancing means whereby a table of the above type is maintained in a folded storage position against accidental unfolding movements.

Still another object of my invention is the provision of novel means for supporting one end portion of a table of the above type to a building wall or the like.

Another object of my invention is the provision of a table of the above type having novel means for attachment to a building wall, said means permitting detachment of the table from the wall and including an independent supporting device whereby the table may be placed in any desired position in a room.

The above and still further highly important objects and advantages of my invention will become apparent from the following detailed specification, appended claims and attached drawings.

Referring to the drawings, which illustrate the invention, and in which like characters indicate like parts throughout the several views:

Fig. 1 is a view in perspective of a table made in accordance with my invention, some parts being broken away, said table being shown in its unfolded operative position;

Fig. 2 is a view corresponding to Fig. 1 but showing the table in partially folded condition;

Fig. 3 is an enlarged fragmentary view in plan of my novel table structure, some parts being broken away and some parts being shown by dotted lines;

Fig. 4 is a fragmentary view in side elevation of the structure of Fig. 3, some parts being shown by dotted lines;

Fig. 5 is a view in end elevation of my novel table structure in a folded condition;

Fig. 6 is a view in side elevation of the table of Fig. 5;

Fig. 7 is a fragmentary detail partly in plan and partly in section, taken on the line 7—7 of Fig. 6 on an enlarged scale;

Fig. 8 is a view partly in end elevation and partly in section, taken on the line 8—8 of Fig. 6;

Fig. 9 is a view in end elevation of my novel table structure in its operative position;

Fig. 10 is a fragmentary view in side elevation illustrating the folding and unfolding movements of my novel table structure;

Fig. 11 is an enlarged fragmentary section taken substantially on the line 11—11 of Fig. 9;

Fig. 12 is an enlarged fragmentary detail of a hinge connection illustrated in Fig. 8;

Fig. 13 is an enlarged fragmentary sectional detail taken substantially on the line 13—13 of Fig. 7;

Fig. 14 is a view partly in side elevation and partly in section of a modified form of my invention;

Fig. 15 is a view in perspective of the under side of one end portion of the table structure of Fig. 14;

Fig. 16 is a view corresponding to Fig. 14 but showing the table of Fig. 14 in a folded position in a wall structure;

Fig. 17 is a view in end elevation of the structure of Fig. 16;

Fig. 18 is a view partly in end elevation and partly in section taken substantially on the line 18—18 of Fig. 14;

Fig. 19 is a view partly in section and partly in side elevation taken on the line 19—19 of Fig. 18;

Fig. 20 is a fragmentary detail in section taken on the line 20—20 of Fig. 19; and Figs. 21 and 22 are views corresponding to Fig. 20 but showing different positions of the parts thereof.

In the preferred embodiment of the invention illustrated in Figs. 1 to 13 inclusive, a generally rectangular table top 1 is shown as comprising a pair of elongated table top sections 2 and 3 normally disposed in end to end substantially abutting relationship. The table top sections 2 and 3 may be made from any suitable material such as wood, metal and the like and are rigidly secured to generally rectangular underlying frames 4 and 5 respectively that are made up of longitudinally extending frame members 6 and longitudinally inner and outer cross members 7 and 8.

A central supporting structure 9 comprises a base 10 and a pair of supporting members 11. Each of the supporting members 11 includes a transversely extending horizontal table supporting member or seat 12 each of which is adapted to engage and freely seat the under side of the end portion of the adjacent table top section when said sections are in their operative horizontal positions. The opposite end portions of the supporting members 11 are downturned to provide legs 13 which are bolted or otherwise rigidly secured to upstanding plates 14 of the base 10 by means of nut-equipped bolts or the like 15. Rigidity is imparted to the supporting elements 11 by tubular webs 16 at the lower end portions of the legs 13 and spacer bars or the like 17 welded or otherwise rigidly secured to the intermediate portions of the transverse table supporting seats 12. With reference particularly to Figs. 6, 7 and 8, it will be seen that the tubular webs 16 are bolted to the plates 14 as indicated at 18. The lower ends of the legs 13 are inturned to provide opposed feet 19 to the inner ends of which are welded bearing plates or the like 20. The bearing plates 20 each journal the opposite end portions of a pair of spaced parallel rock shafts 21 which extend transversely of the supporting structure 9 in a horizontal plane below the plane of the table supporting seats 12.

The base 10 of the supporting structure 9 further includes a pair of laterally outwardly diverging seat supporting pedestal elements 22 which project laterally outwardly of the plates 14 thereof and which at their bottoms are provided with caster wheels or the like 23. The pedestal elements 22 are braced by brace members 24, the central portions of which are welded to the lower ends of the plates 14 and the outer diverging ends of which are welded or otherwise rigidly secured to the downturned ends 25 of the pedestals 22 as indicated at 26.

Means for supporting the outer ends of the table top sections 2 and 3 in their operative horizontal positions comprises a pair of end supporting elements 27 each made up of a pair of spaced parallel leg members 28 that are pivotally secured at their upper ends each to a different longitudinal frame member 6, as indicated at 29, and an inverted generally U-shaped member 30 disposed in the same plane as the leg members 28 and welded or otherwise rigidly secured at its intermediate portion to said legs as indicated at 31. The free ends of the U-shaped member 30 provide floor engaging feet 32. The end supporting elements 27 and various component parts of the central supporting structure 9 may be made from any suitable material, but preferably and as shown are made from metallic tubular stock which is relatively strong and of light weight.

The pivotal connections 29 enable the end supporting members 27 to be moved between their table supporting positions at substantially right angles to the table top sections and inoperative folded positions substantially parallel to their respective table top sections. In order to rigidly lock the end supporting elements 27 in either of these positions I provide a pair of locking levers 33, one for each end supporting element 27. The locking levers are identical and are indicated by like reference characters. For the sake of brevity, but one thereof will be described. With reference to Fig. 11, it will be seen that the locking lever 33 is pivotally secured at its inner end to one of the legs 28, as indicated at 34, for upward and downward swinging movements with respect to the leg 28. The lever 33 extends through an elongated aperture or slot 35 in a latch plate or the like 36 welded or otherwise anchored to an adjacent cross frame member 8. The lever 33 is provided with a pair of longitudinally spaced downwardly opening notches 37 one of which is adapted to receive the portion of the plate 36 at the lower end of the slot 35 when the end supporting element 27 is in table supporting position at right angles to the associated table top section, and the other of which is adapted to receive said portion of the plate 36 when the end supporting section is in its inoperative position. The outer end of the lever 33 terminates in a handle 38 by means of which the lever 33 may be moved against the yielding bias of a torsion spring 39 which urges the lever 33 in a direction to be locked with respect to the latch plate 36. With further reference to Fig. 11 it will be seen that the pivotal connections between the upper end of the leg members 28 include plate-like members 40 which engage their adjacent frame members 6 to limit swinging movements of the end supporting members 27 in a direction longitudinally outwardly with respect to their associated table top sections.

For supporting and guiding the table top sections 2 and 3 between their normal operative horizontal positions of Fig. 1 and their inoperative positions of Fig. 6, I provide pairs of cooperating control links connecting said table top sections and the central supporting structure 9. The control links of one of said pairs, hereinafter designated as the first control links, each underlie a separate table top section and are indicated at 41 and 42 respectively. The first control link 41 is pivotally mounted at its inner end 43 to the intermediate portion of the transverse seat forming member 12 associated with the table top section 2 for upward and downward swinging movements, the outer end thereof being pivotally secured to bracket members 44 as indicated at 45. The bracket members 44 form part of the frame 4, the axis of the pivotal connection 45 being parallel to the cooperating seat forming element 12. Likewise, the first control link 42, associated with the table section 3, is pivotally secured to the intermediate portion of its respective transverse seat forming element 12 as indicated at 46 for upward and downward swinging movements, the outer end of said link 42 being pivotally secured to bracket members 47 as indicated at 48 and in exactly the same manner as the link 41. The bracket members 47 form part of the frame 5, see Fig. 8. The other pair of control links, hereinafter designated as the second control links, are indicated by the reference characters 49 and 50, the former of which underlies the table top section 2 and the latter of which underlies the table top section 3. The second rigid control link 49 comprises the transverse shaft 21 underlying the table top section 2, a pair of laterally spaced arms 51 and a tubular transverse shaft 52. The shaft 21, the arms 51 and the tubular shaft 52 are rigidly secured together as by welding or the like. The shaft 52 is journalled in the frame members 6 associated with the table top section 2 at a point longitudinally outwardly of the pivotal connection 45 when the top section 2 is in its operative position and on an axis parallel to the axis of its associated shaft 21. The cooperating second rigid control link 50 is identical to the control link 49 and comprises the tubular rock shaft 21 underlying the table top section 3, a pair of laterally spaced parallel arms 53 welded or otherwise rigidly secured to the last-mentioned rock shaft 21 and a tubular shaft 54 anchored to the outer ends of the arms 53 and journalled in the frame members 6 of the table top section 3 for pivotal movements on an axis parallel to the axis of the associated rock shaft 21. The tubular shaft 54 is disposed longitudinally outwardly of the pivotal connection 48 in the same manner as the tubular shaft 52 with respect to its cooperating pivotal connection 45.

The table top sections 2 and 3 are yieldingly urged toward their folded inoperative positions of Fig. 6 by counterbalancing torsion springs 55 of which there are preferably four in number. Each spring 55 encompasses a laterally outwardly extended end portion 56 of the rock shafts 21 laterally outwardly of the adjacent bearing plate 20, and has one end 57 hooked under the bottom edge of its cooperating bearing plate 20. The extreme opposite ends of the rock shafts 21 are provided with axially outwardly opening notches 58 which receive the outer ends 59 of the torsion springs 55. The springs 55 are wound in directions to urge the rock shafts 21 in a direction to impart upward swinging movements to their respective control link arms 51 and 53.

My improved table may be used with or without built-in benches or seats as desired. For this reason I provide removable seats or benches comprising elongated seat elements 60 rigidly secured to supporting frames 61 which project laterally inwardly and upwardly at their opposite end portions and which have their extreme opposite inner and outer ends 62 and 63 respectively pivotally secured to hanger brackets or the like 64 and 65 depending from the frames 4 and 5, the former adjacent the inner end thereof and the latter adjacent the outer end supporting elements 27. As shown in Fig. 3, the frames 61 toward their inner ends extend diagonally laterally inwardly as indicated at 66 so as to lie along side the adjacent outwardly diverging pedestal members 22. With this arrangement, it will be seen that a maximum of leg room is provided for occupants of the benches 60. The pivotal connections between the upstanding ends 62 and 63 of the various supporting frames 61 and their respective hanger members or bars 64 and 65 respectively comprise hinge pins 67 anchored in the ends of the frames 61 and extending through apertures 68 in the hanger bars, see Fig. 12. It will be noted that the hinge pins 67 on opposite ends of each frame 61 are axially aligned longitudinally of the benches and table sections so as to permit swinging movements of the benches 60 and their frames 61 between operative positions wherein the benches rest upon the pedestals 22 and the U-shaped members 30 of the end supporting elements 27, and inoperative positions wherein the tops of the benches 60 engage and rest upon the top surfaces of their cooperating table top sections 2 and 3 as indicated by dotted lines in Fig. 9. The seat mounting frames 61 have sufficient resilience to enable the end portions 62 and 63 thereof to be moved toward each other sufficiently to enable the hinge pins 67 to be disengaged from the apertures 68 in the hanger members 64 and 65. Thus the benches or seats 60 together with their supporting frames 61 may be quickly and easily removed in the event that conventional chairs are used with the table, and as quickly and easily replaced when desired.

When it is desired to fold up my novel table structure for storage or the like, the benches 60 are swung upwardly and inwardly into engagement with the top surfaces of their respective table sections as indicated by dotted lines in Fig. 9. Thereafter, the locking lever 33 associated with one table top section is lifted out of engagement with the cooperating portion of the latch plate 36 and the end supporting element 27 swung about its axis to its inoperative position substantially parallel to the table top section. Such swinging movement is indicated by a broken line A in Fig. 10. When the end supporting element 27 is moved to its inoperative position, the longitudinally outer notch 37 of the locking lever 33 will engage the latch plate 36 whereby to lock the end supporting element in its inoperative position. As soon as the end supporting element 27 is moved out of engagement with the floor, indicated at X, the outer end of the table section 2 will tend to gravitate toward the floor about the axis of the shaft 52. The table top section 2 and the frame 4 associated therewith may be then manually swung about the axis of the shaft 52 in a counter-clockwise direction with respect to Fig. 10, the longitudinally outer edge of the top section 2 following a path indicated by the broken line B in Fig. 10, downwardly and inwardly toward the central supporting structure 9. Simultaneously, the longitudinally inner edge will tend to follow a path indicated by the broken line C in Fig. 10. The counterbalancing springs 55 urge the second control link 49 upwardly and longitudinally inwardly about the axis of its associated rock shaft 21 in a clockwise direction. The first control link 41 will also be swung upwardly in a clockwise direction, the pivotal connection 45 thereof describing an arc indicated by the broken line D. It will be here noted that the shaft 52 describes an arc indicated by the broken line E. Thus, during the movement of the table top section 2 from its horizontal operative position, shown by full lines in Fig. 10, to its inoperative storage position shown by dotted lines therein, the table top section 2 swings in a direction counter to the direction of swinging movement of the control links. With this arrangement, very little effort is required to move the table top section from its operative position to its inoperative positions. With the table top section in its inoperative storage position, the load applied thereby to the counterbalancing springs 55 is very light. For this reason, the springs 55 are able to hold the table top section in its inoperative position against accidental displacement. The opposite table top section 3 and its cooperating benches 60 are moved to their inoperative storage positions in exactly the same manner all being accomplished in a minimum of time and with a minimum of effort. With the tables thus arranged, the entire structure may be easily moved to a suitable place for storage.

In the modified form of the invention illustrated in Figs. 14 to 22 inclusive, a table top 1' is shown as comprising a pair of cooperating table top sections 2' and 3' each mounted on a respective generally rectangular frame 4' and 5'. A central supporting structure 69 is preferably made from metallic tubing and formed into inverted generally U-shape to provide a transversely extending supporting element or seat 70 and laterally spaced depending legs 71 having ground or floor engaging rollers 72 at their lower ends. The transverse supporting element or seat 70 engages and freely supports the adjacent inner ends of the table top sections 2' and 3'.

At its outer end, the table top section 3' is supported by an outer end supporting member 27' which is adapted to be locked in its operative table supporting position of Fig. 14 by a locking lever 33'. The table top section 2' at its outer end is adapted to be supported by a pair of legs 73 and 74 that are joined intermediate their ends by a brace member 75. Plate-like mounting brackets 76 are welded to the upper end portions of the legs 73 and 74 and are pivotally secured to side frame members 77 and 78 of the frame 4' as indicated at 79.

The table top sections 2' and 3' are connected to the transverse supporting seat 70 each by one of a pair of first control links 41' and 42' respectively that are pivotally secured at their inner ends to the transverse seat 70 for upward and downward swinging movements and at their outer ends to the intermediate portions of the frames 4' and 5' respectively as indicated at 45' and 48' respectively. A pair of rigid second control links 49' and 50' underlie their respective table top sections 2' and 3' and have their inner ends pivotally secured to the supporting structure 69 as indicated at 80 and 81 respectively for upward and downward swinging movements. The outer ends of the control links 49' and 50' are pivotally secured to their respective frames 4' and 5' longitudinally outwardly of the pivotal connections of the first control links 41' and 42' thereto, as indicated at 52' and 54' respectively. The modified form of the invention described thus far is similar to that illustrated in Figs. 1 to 13 inclusive, the parts bearing numerals with prime marks added being closely similar to those parts bearing like numerals in the preferred form of the invention above described. It will further be noted, with reference to Fig. 16, that the table top section 3' partakes of movement similar to that of the table top secions 2 and 3 when being moved from is horizontal operative position to its inoperative storage position.

The table 1' is particularly adapted to be connected to and supported by a supporting structure anchored to a building wall surface or received within a recess within a wall. Such a building wall is indicated by the numeral 82 having a recess 83 therein. Rigidly secured to the opposite sides 84 of the recess 83 are a pair of relatively stationary guide rails or the like 85 which extend vertically from the floor X'. A supporting member indicated in its entirety at 86 comprises a pair of slides 87 one each mounted and guided in a different one of said guide rails 85 and a tubular cross bar or arm 88 anchored to the slides 87 adjacent their lower ends. Laterally spaced pairs of gripping elements 89 and 90 have hook-like ends 91 and 92 which are adapted to embrace the arm 88 for pivotal movements about the axis thereof. The gripping element 89 is rigidly secured to the under side of the table top section 2' as by welding or the like to the frame 4' thereof. The movable gripping elements 90 are pivotally secured intermediate their ends one each to one of a cooperating one of the stationary gripping elements for upward and downward swinging movements and as indicated at 93. Intermediate the pivotal connections 93 and their inner ends, the movable gripping elements 90 are provided with arcuate slots 94 each of which receives a pin 95 which projects laterally outwardly from an adjacent leg 73. The arrangement of the pin and slot connection 94—95 with respect to the pivotal connection 79 between the legs 73 and the frame 4' is such that when the legs 73 are in their horizontal inoperative position indicated by full lines in Fig. 14, the hook-like ends 91 and 92 of the gripping elements are in operative engagement with the arm 88. When the legs 73 are swung downwardly to their generally vertical table top supporting position as indicated by dotted lines in Figs. 14 and 19, the movable gripping elements 90 are positioned so that the hook-like elements 91 and 92 are spaced apart sufficiently to permit withdrawal from the arm 88. In this position of the legs 73, it will be seen that the pins 95 thereof are seated in recess 96 at one end of the slots 94 whereby the legs 73 are held in vertical table supporting position. The movable gripping elements 90 may be locked in arm gripping positions by bolts 97 extending through apertures 98 in the inner ends of the gripping elements 90 and screw threaded into threaded holes, not shown, in the legs 73.

The slides 87 are releasably locked in their upper table supporting positions by releasable latch mechanism which may be of any suitable type, but as shown, may comprise resilient latch bars 99 one each anchored to one of the opposed guide rails 85. Each of the slides 87 is formed to provide an abutment 100 which is engageable by the upper end of a slide block 101 vertically slidably mounted in a slot 102 in the slide 87. Each slide block 101 is provided adjacent its lower end with a cam-acting surface portion 103 which is engageable with the outturned abutment engaging end 104 of the latch bar 99 in a manner now to be described. The slide block 101 is gravity biased toward the bottom of the slot 102 as shown in Figs. 20 and 22. When the end supporting member 86, including the slides 87, is raised to its table top supporting position, the latch bar 99 each being yieldingly biased toward engagement with its cooperating abutment 100, snaps into table supporting position as indicated in Fig. 20. When it is decided to fold up the table 1', the end supporting member 86 is manually raised to its dotted line position of Fig. 20, causing the slide blocks 101 to move their respective latch members 99 inwardly toward the bottom of its respective rail whereby the upper abutment engaging end 104 thereof will be moved out of the path of travel of the abutments 100. The adjacent end of the table top section 2' together with the supporting member 86 is then permitted to move downwardly. At this time, the frictional engagement of the slide blocks 101 with their cooperating latch bars 99 is sufficient to cause the slide blocks to remain stationary until the upper ends thereof engage the abutments 100 as indicated in Fig. 21. The inner surfaces 105 and 106 of the slide blocks 101 and the slides 87 respectively form a continuous wall over which the latch bars 99 slide, thus permitting the supporting member 86 to move downwardly beyond the latch bars 99 as illustrated in Fig. 22.

During the initial folding movements of the table 1', the tendency of the outer end of the table top section 2' to move longitudinally inwardly toward the central supporting structure 69 causes the entire table structure to move toward the wall 82. When the central supporting structure 69 is received within the recess 83, the table top section 2' is disposed substantially parallel to and adjacent the rear wall 83a of the recess. Thereafter, the locking lever 33 is unlatched, and the end supporting member 27' moved to its inoperative position in the same manner as its corresponding member 27 of the structure of Figs. 1 to 13 inclusive. The outer end of the table top section 3' then moves downwardly and inwardly as shown by the broken line B' in Fig. 16, the outer ends of the control links 42' and 50' describing arcs D' and E' respectively, see Fig. 16, in a direction counter to the direction of swinging movement of the table top section 3'. As further shown in Figs. 16 and 17, when the table top section 3' is moved to its inoperative storage position the top surface thereof will be substantially flush with the wall 82.

From the above, it will be seen that the modified form of the invention illustrated may be anchored to and supported by end supporting member 86, or removed from engagement therewith and supported at that end by the legs 73 as desired. Although the same are not shown, the counterbalancing springs 55 may be, if desired, applied to the modified form of the invention to aid in moving the table top sections to their storage positions and maintaining the same in said storage positions. If desired, the benches or seats 60 of the preferred form of the invention illustrated may be applied to the table structure 1' without changing the structure thereof materially.

My invention has been thoroughly tested and found to be completely satisfactory for the accomplishment of the objectives set forth; and while I have shown and described a commercial form of my novel table structure and a single modification thereof, it will be understood that the same is capable of further modification within the spirit and scope of the invention as defined in the claims.

What I claim is:

1. In a fold-up table, a supporting structure providing a seat, a table top section having one end thereof normally disposed over and freely resting on the seat of the supporting structure, a first rigid control link normally underlying the table top and pivotally connected adjacent one of its ends to the supporting structure adjacent said one end of said table top section for upward and downward swinging movements of its other end and pivotally connected adjacent said other end to the intermediate under portion of the table top section, a second rigid control link underlying the table top section and pivotally connected adjacent one of its ends to the supporting structure adjacent said one end of said table top section for rotation about a horizontal axis downwardly spaced from the horizontal plane of the axis of the pivotal connection of the first link to the supporting structure for upward and downward swinging movements of its other end and being pivotally connected adjacent its said other end to the intermediate underside portion of the table top section at a point outwardly spaced from the pivotal connection of the first said link to the table top section, and means supporting the other end of the table top section when the latter is in a horizontal position, whereby under upward swinging movements of the first and second control links the table top section will be swung upwardly and inwardly from a normal generally horizontal operative position to a generally vertical storage position about the axis of the pivotal connection of the first control link thereto and in an angular direction counter to that of the first link, thus causing said one end of the table top to move upwardly away from its seat on the supporting structure and the other end thereof to move downwardly and inwardly toward the vertical planes of the said pivotal connections to the supporting structure.

2. The structure defined in claim 1 in which said first control link is disposed in substantially parallel relationship to said table top section when the table top section is resting on the supporting structure.

3. In a fold-up table, a central supporting structure providing a seat, a table top comprising a pair of cooperating top sections having their inner ends normally freely resting on said seat, a pair of like first rigid control links each underlying a different one of said table top sections and each pivotally connected adjacent its inner end to the supporting structure for independent upward and downward swinging movements of its outer end and each being pivotally connected at its outer end portion to the intermediate under portion of the adjacent table top section, a second pair of like rigid control links each underlying a different one of said table top sections and each pivotally connected adjacent its inner end to the central supporting structure in a horizontal plane downwardly spaced from the horizontal plane of the axis of the pivotal connection of the adjacent link of said first pair of links to the supporting structure for upward and downward swinging movements of its outer end and each being pivotally connected adjacent its outer end to the intermediate underside portion of its respective table top section at a point outwardly spaced from the pivotal connection of the cooperating first link to its respective table top section, and means supporting the outer ends of said top sections when said sections are in a horizontal position, whereby, under upward swinging movements of the first and second control links of each pair thereof said table top sections will be swung from generally horizontal operative positions to generally vertical inoperative storage positions each about the axis of the pivotal connection of its respective first control link and in an angular direction counter to that of its respective first link, thus causing the inner ends of the table top sections to move upwardly away from their seats on the supporting structure and the outer ends thereof to move downwardly and inwardly toward the vertical planes of said pivotal connections to the supporting structure.

4. The structure defined in claim 3 in further combination with counterbalancing springs connected to said central supporting structure and said second control links yieldingly urging said second control links in the direction of the positions assumed thereby when the table top sections are in their inoperative storage positions.

5. In a fold-up table, a supporting structure, a generally rectangular frame, a table top anchored on said frame and having one end thereof normally disposed over and freely seated on the supporting structure, a first rigid control link normally underlying the table top and pivotally connected adjacent one of its ends to the supporting structure for upward and downward swinging movements of the other end and pivotally connected adjacent said other end to the intermediate portion of said frame, a second rigid control link underlying the table top and pivotally connected adjacent one of its ends to the supporting structure in a horizontal plane downwardly spaced from the horizontal plane of the axis of the pivotal connection of the first link to the supporting structure for upward and downward swinging movements of the other end and being pivotally connected adjacent the other end to said frame at a point outwardly spaced from the pivotal connection of the first said link thereto, and means supporting the other end of the table top when the latter is in a horizontal position, whereby, under upward swinging movements of the first and second control links, the table top and frame will be swung from a normal generally horizontal operative position to a generally vertical inoperative storage position about the axis of the pivotal connection of the first control link thereto in an angular direction counter to that of the first link, thus causing the one end of the table top and frame to move upwardly away from seating engagement with the supporting structure and the other end thereof to move downwardly and inwardly toward the vertical planes of the said pivotal connections to the supporting structure, and yielding counterbalancing means urging the links in the direction of the positions assumed thereby when the table top is in its inoperative storage position.

6. In a fold-up table, an elongated flat table top, a supporting frame structure comprising a transversely extending horizontally disposed seat-forming member underlying and freely supporting one end portion of said table top, said member providing a pair of laterally spaced depending legs, opposed bearing members anchored to said frame structure below said seat-forming member, a transverse shaft journalled in said bearings in downwardly spaced parallel relation to said seat-forming member, a first rigid control link underlying the table top and pivotally connected at one of its ends to the seat-forming member for upward and downward swinging movements of its other end about an axis parallel to said shaft and being pivotally connected at its other end to the intermediate under portion of the table top, a second rigid control link underlying the table top and rigidly secured at one of its ends to said shaft for upward and downward swinging movements of its other end about the axis of said shaft and being pivotally connected adjacent its other end to the intermediate under side portion of the table top at a point outwardly spaced from the pivotal connection of said first link to the table top, means supporting the other end portion of the table top when the latter is in a horizontal position, whereby, under upward swinging movements of said control links, the table top will be swung from a normal generally horizontal operative position to a generally vertical storage position about the axis of the pivotal connection of the first control link thereto in an angular direction counter to that of the first link, thus causing the one end portion of the table top to move upwardly away from its seat on the supporting structure and the other end portion thereof to move downwardly and inwardly toward said seat-forming member and said shaft, and yielding means tending to rotate said shaft in a direction to impart upward swinging movements to said second control link.

7. In a fold-up table, an elongated table top comprising a pair of cooperating top sections, a central supporting structure including a base and a pair of supporting members providing spaced parallel horizontally disposed transverse seat forming portions adapted to engage and freely seat the under sides of the end portions of said table top sections and depending leg portions anchored to the base, a pair of transverse shaft elements journalled in the supporting structure each below and parallel to a different one of the seat forming portions, a pair of first rigid control links each underlying a different one of said table top sections and each pivotally connected adjacent its inner end to an adjacent one of said seat forming portions for independent upward and downward swinging movements of its outer end and each being pivotally connected at its outer end portion to the intermediate under portion of the adjacent table top section on an axis extending transversely thereof, a second pair of rigid control links each underlying a different one of said table top sections and each anchored adjacent its inner end to a different one of said shaft elements and pivotally connected adjacent its outer end to the intermediate under side portion of its respective table top section on a horizontal axis extending transversely of the table top at a point outwardly spaced from the pivotal connection of the cooperating first link to its respective table top section, means supporting the outer ends of said top sections when said sections are in a horizontal operative position, whereby, under upward swinging movements of the first and second control links of each pair thereof, their respective table top sections will be swung from generally horizontal operative positions to generally vertical storage positions, each about the axis of the pivotal connection of its respective first control link and in an angular direction counter to that of said respective first control link, thus causing the inner ends of the table top sections to move upwardly away from their seats on the supporting structure and the outer ends thereof to move downwardly and inwardly toward said shafts, and yielding means tending to rotate said shafts in a direction to impart upward swinging movements to said second control links.

References Cited in the file of this patent

UNITED STATES PATENTS

| Number | Name | Date |
|---|---|---|
| 319,915 | Linsley et al. | June 9, 1885 |
| 1,369,199 | Snyder | Feb. 22, 1921 |
| 1,828,780 | McKnight | Oct. 27, 1931 |
| 2,131,675 | Schieber | Sept. 27, 1938 |
| 2,203,394 | Schieber | June 4, 1940 |
| 2,260,478 | Peter | Oct. 28, 1941 |
| 2,421,127 | Peckham | May 27, 1947 |
| 2,436,730 | Repke | Feb. 24, 1948 |
| 2,521,547 | Simonowitz | Sept. 5, 1950 |
| 2,545,064 | Alch | Mar. 13, 1951 |
| 2,569,007 | Klyce | Sept. 25, 1951 |
| 2,645,539 | Thompson | July 14, 1953 |
| 2,647,562 | Hoffar | Aug. 4, 1953 |
| 2,650,146 | Mugler | Aug. 25, 1953 |